J. DEL VALLE.
TIME METER.
APPLICATION FILED SEPT. 21, 1914.
1,128,557.
Patented Feb. 16, 1915.
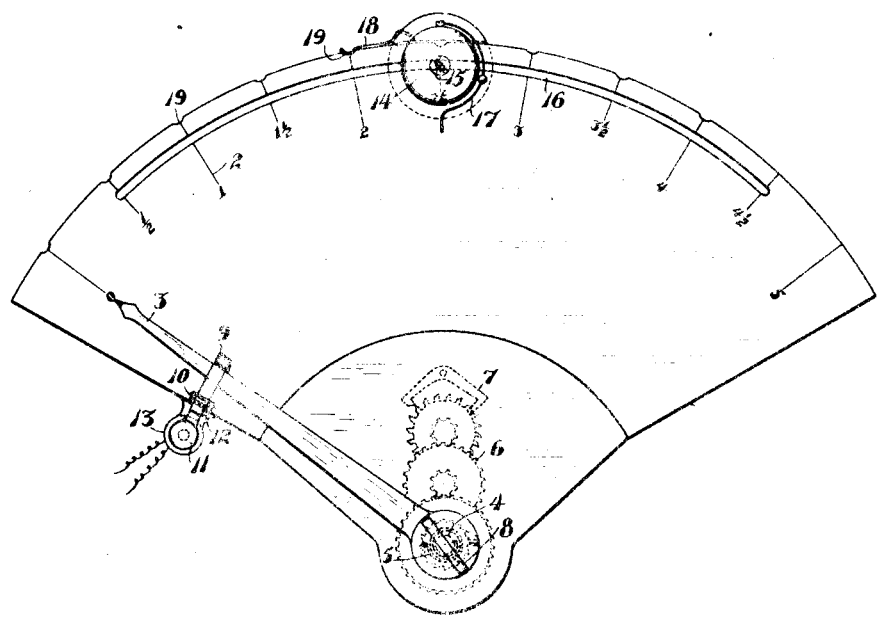
WITNESSES:
INVENTOR,
Joseph Del Valle
BY
ATTORNEY

UNITED STATES PATENT OFFICE.

JOSEPH DEL VALLE, OF SAN FRANCISCO, CALIFORNIA.

TIME-METER.

1,128,557.  Specification of Letters Patent.  Patented Feb. 16, 1915.

Application filed September 21, 1914. Serial No. 862,667.

*To all whom it may concern:*

Be it known that I, JOSEPH DEL VALLE, a citizen of the United States, residing at San Francisco, in the county of San Francisco and State of California, have invented new and useful Improvements in Time-Meters, of which the following is a specification.

The object of the present invention is to provide an instrument for indicating very conspicuously the passage of a short interval of time of any precise length desired. It is especially adapted for use on occasions when the mind is principally occupied with matters other than that of the passage of time, and when, nevertheless it is important to note the amount of time expended. As an example of the use of my invention there may be instanced long distance telephoning, for which the invention was primarily devised. The usual rates are based on a service of one, two or three or more minutes for a stipulated price. Now, when one is using the long distance telephone, the mind is usually so occupied with the subject which is being discussed that one's impression of the amount of time consumed is very vague. Therefore, for fear of exceeding the rate allowance, and incurring extra charges, the conversation is carried on in a great hurry, and consequently many important things are forgotten or not clearly stated, and then after one has hurried and rushed to finish the conversation within the time limit, it is found that there still remains to one's credit from one-half to two minutes more time which could have been used without charge.

The object then of the present invention is to provide a device by which the passage of time can be easily and plainly noted without requiring any distraction of the mind from the subject matter it is engaged upon.

The invention may also be used for various purposes other than telephoning, such as for boiling eggs, or for various uses in photography where a short time period needs to be accurately indicated.

In the accompanying drawing, the figure is a front view of my improved time indicator.

Referring to the drawing, 1 indicates the face of a meter having a circular scale 2 divided into five (or more if desired) equal arcs, each arc representing one minute, and being again divided into two parts to show the half minutes. Over this scale travels a pointer or hand 3 on a shaft 4, which is actuated by a spring or weight, the former being here shown, as at 5, said shaft being connected to clock-work 6, having an escapement 7 for regulating the speed of rotation of the shaft and pointer, this speed being such that the pointer requires five minutes to pass over the meter from the indication "0" to the indication "5."

The pointer 3 when drawn back to the zero position reënergizes the spring or weight. It may be so moved back by the hand either directly or by means of a key 8 on the shaft 4. When moved back to zero position it is automatically engaged by one end of a latching lever 9 pivoted at 10, the other end of said lever carrying a button 11, which, being depressed against the action of a spring 12, raises the latching portion of said lever and releases the pointer. Said end may be depressed from a distant point, as the telephone exchange, by an electromagnet 13, or by the finger applied directly thereto. Upon depressing the button the pointer is immediately released and begins to move under the action of the spring or weight, so that upon releasing the button the pointer is not again latched thereby, but continues to move over the indicating scale. This indicating scale is in view of the user of the device and is on a sufficiently large scale to be clearly visible, thus not distracting in any material degree his attention from the matter in hand.

In order that the attention of the user of the device may be drawn to the fact that the period of time allowed for the conversation over the telephone is approaching its completion, I provide a bell 14, adjustably attached to the meter by means of a clamping screw 15, movable in an arcuate slot 16, the hammer 17 of which bell extends into the path of the outer end of the pointer or handle. This bell is clamped at a short distance, say, that corresponding to one-half a minute of time, in front of the index corresponding to the end of the time allowed for the conversation, and is centered by means of a spring 18 engaging one of a series of notches 19 in the edge of the meter. As the pointer moves in its circular path, its end impinges against the outer end of the hammer and withdraws the hammer from the bell until such time as the end of the hammer has escaped from the end of the pointer, whereupon the hammer springs back and the bell is sounded, apprising the user of the device of the time which still remains to finish his conversation.

The instrument may be portable, so that it can be placed where most convenient for observation, or, when used with a telephone, can be constructed as an adjunct of that instrument. It can also be made so that it can be attached to a wall or at a desk near the telephone where it will be easily and plainly visible.

I claim:—

In combination, an indicating scale, a device movable relatively thereto, clock-work mechanism for actuating said device, a latch for releasing the device from zero of the scale and automatically engaging the device when at zero, and a bell adjustably secured adjacent to said scale and adapted to be actuated by said device in its movement.

In testimony whereof I have hereunto set my hand in the presence of two subscribing witnesses.

JOSEPH DEL VALLE.

Witnesses:
F. M. WRIGHT,
D. B. RICHARDS.